Dec. 6, 1955 W. E. MARTIN 2,725,994
UNIVERSALLY LOADABLE TRAILER BED
Filed Sept. 14, 1951 2 Sheets-Sheet 2
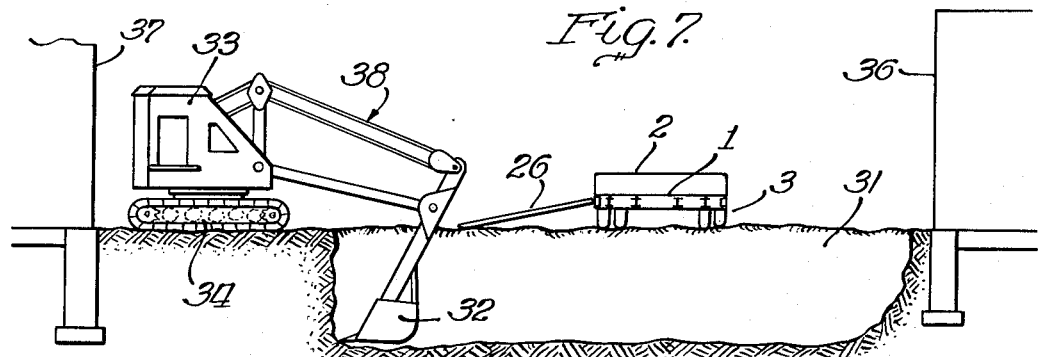
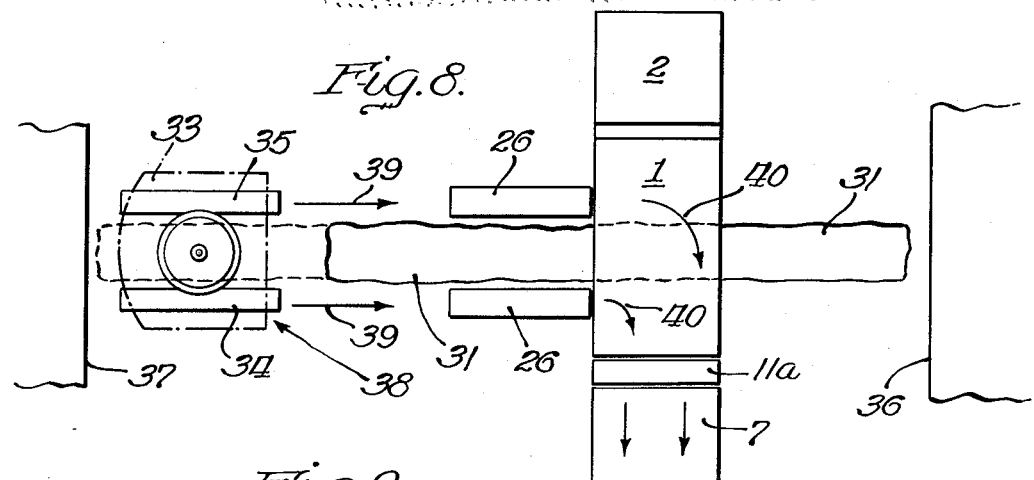
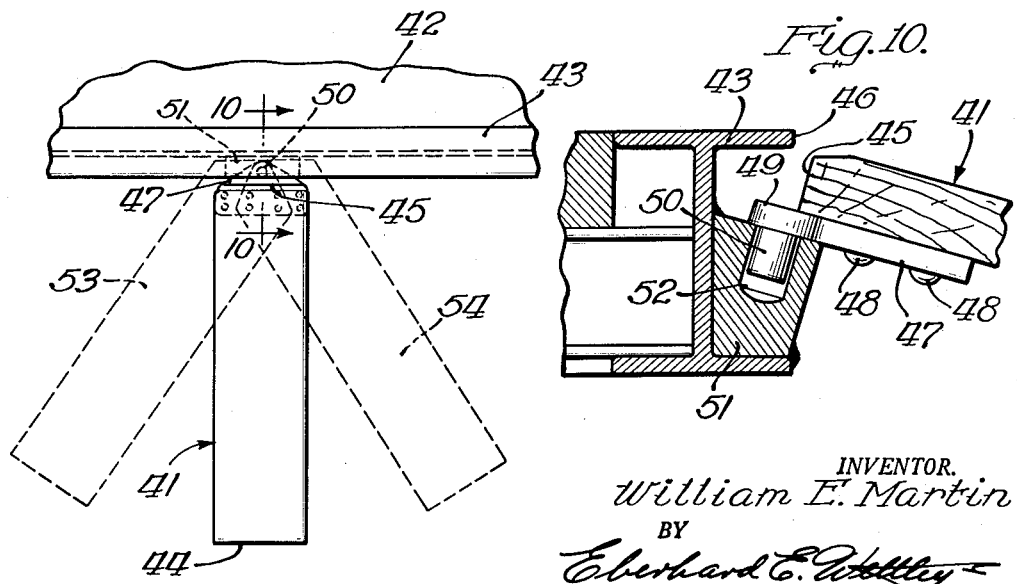
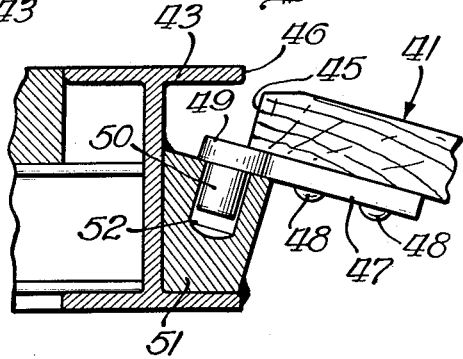
INVENTOR.
William E. Martin
BY
Eberhard E. Welley
Atty.

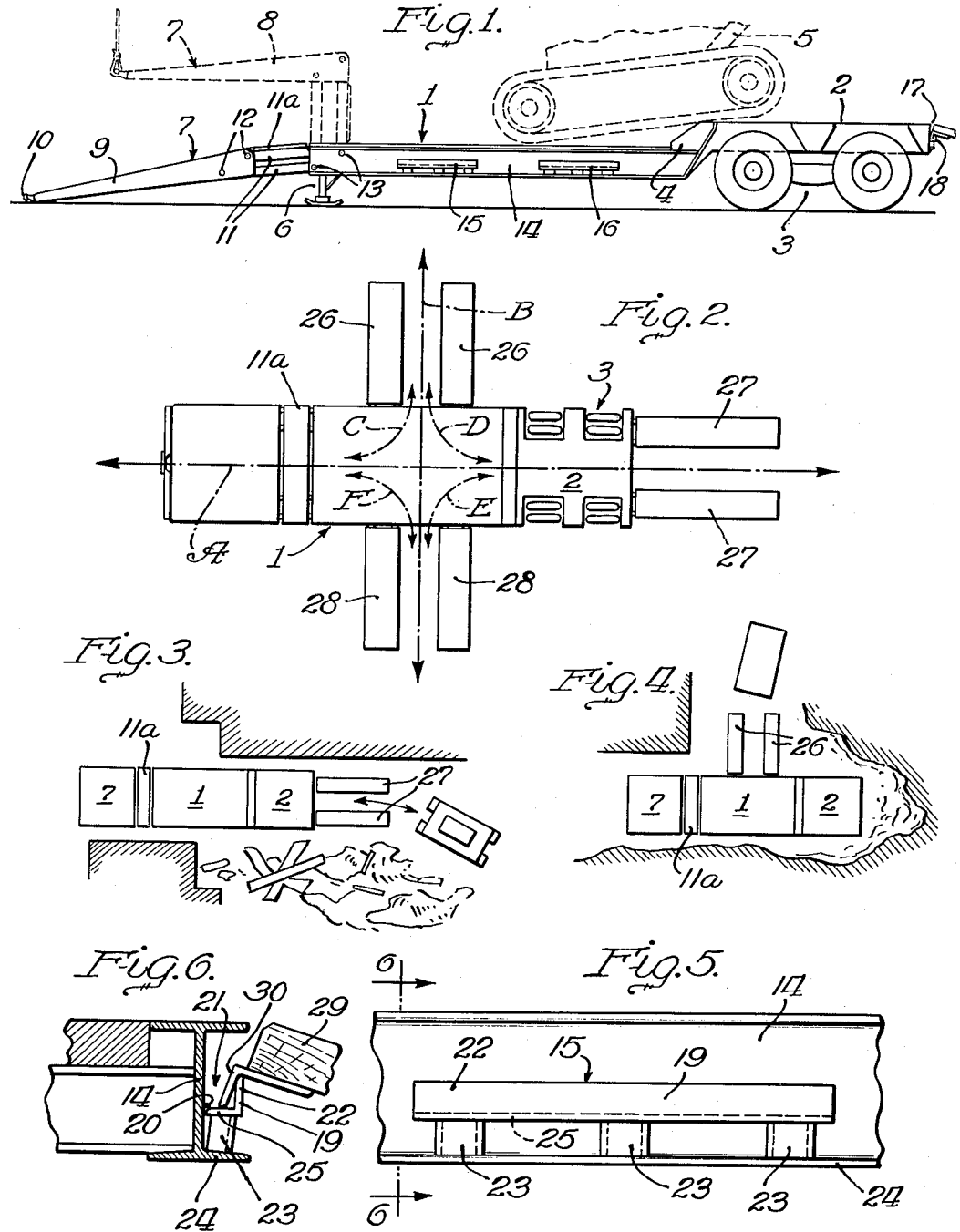

United States Patent Office 2,725,994
Patented Dec. 6, 1955

2,725,994

UNIVERSALLY LOADABLE TRAILER BED

William E. Martin, Kewanee, Ill.

Application September 14, 1951, Serial No. 246,534

8 Claims. (Cl. 214—85)

The present invention relates to a trailer having a loading platform or bed arranged for universal loading or unloading over any peripheral edge thereof.

From actual field experience, it has been found that situations arise wherein a trailer only equipped for loading over one side or one end thereof cannot be used in its designed capacity due to obstruction, limited space conditions, or for many purposes for which a trailer of the equipment hauling variety was normally devised.

It is one of the main objects of the present invention to provide a trailer that has the facility for loading or unloading vehicles for transportation or for placement from any particular approach to the carrying bed of the trailer or for discharge of the vehicle into any given predetermined direction from such carrying bed of the trailer.

It is another object of the present invention to provide a trailer bed that combines a foldable gooseneck with back end loading and unloading facilities.

It is also another object of this invention to provide a gooseneck trailer with a foldable forward hitch connection that provides a loading ramp which may be used in combination with loading and unloading of the carrying deck from the rear or from either side of the deck.

A still further object of this invention relating to the present trailer is to provide loading ramps that may be mounted upon or adjacent the bed of the trailer and which ramps may be disposed at angles with respect to the bed edge for diagonally loading or unloading equipment onto or off of the trailer.

Other objects and advantages relating to a universally loadable trailer bed and associated parts that provide the basis for the present invention shall hereinafter appear in the following detailed description thereof having reference to the accompanying drawings forming a part of the specification.

In the drawings:

Fig. 1 is a side elevational view of the trailer of the present invention;

Fig. 2 is a plan view of the arrangement of the trailer and its bed showing the loading arrangements that may be employed to meet various conditions of operation;

Fig. 3 is a diagrammatic plan view of a trailer showing one condition of operation which requires loading over the rear end of the trailer only as in cases where a disabled vehicle is to be moved from a limited loading area to another location;

Fig. 4 shows another arrangement wherein the trailer of this construction may be employed in picking up another disabled vehicle from a limited loading area;

Fig. 5 is a fragmentary enlarged side elevational view of an edge portion of the trailer bed showing the hook-on arrangement utilized to connect a ramp with the bed;

Fig. 6 is a fragmentary vertical cross sectional view through the bed edge illustrated in Fig. 5 and substantially as seen along the line 6—6 in Fig. 5;

Fig. 7 is a diagrammatic view illustrating another use of the trailer of the present invention in the handling of a piece of heavy equipment such as a back shovel excavator;

Fig. 8 is a plan view of the general conditions existing in Fig. 7 wherein the use of a trailer designed according to the principles of the present invention may be feasibly employed;

Fig. 9 is a fragmentary plan view of a trailer and a modified construction of ramp associated therewith; and Fig. 10 is a fragmentary vertical cross sectional view of the modified arrangement substantially as seen along the line 10—10 in Fig. 9.

The trailer illustrated in Fig. 1 comprises a flat equipment hauling bed 1 which constitutes the loading platform of the trailer, and this bed terminates in a raised platform 2 at the rear end of the trailer to produce a deck or overpass across the tandem axle 3 supporting the rear end of the trailer. A structural ramp 4 connects the bed 1 and platform deck 2 and constitutes a contiguous means between the aforementioned members for accomodating the passage of a vehicle such as illustrated at 5 in broken lines. A retractable foot 6 may be employed at the forward end of the trailer, if desirable, to support the front end of the bed as shown in Fig. 1 for the purpose of operatively manipulating a foldable gooseneck 7 from a raised transportable position as indicated in broken lines at 8 to the full line lowered position wherein one portion of the gooseneck rests upon the ground.

This type of gooseneck comprises a hitch tongue 9 having a cable hook-on bar 10, and the tongue 9 is connected by means of links 11 pivoted at 12 to the tongue and at 13 to the forward end of the bed 1. A bridging plate 11a is connected with the upper set of links to provide a continuous roadway adjacent the bed between the upper surface of the tongue 9 and the upper side of the bed 1.

When the gooseneck 7 is in the position 8, it is arranged for connection or detachment from a fifth wheel of a tractor, and when the gooseneck is lowered, it forms a continuous ground engaging ramp to load the bed 1 at the forward end of the trailer. The same type of foldable gooseneck may be employed with this trailer to function in the same capacity as above described under conditions wherein the foot 6 may not be required, the only change in that arrangement residing in the fact that the bed 1 will be inclined downwardly from its rearward platform support disposed above the tandem axle 3.

Side rails or beams 14 extend along the peripheral side edges of the trailer bed, and house in shielding position therein, the ramp supports 15 and 16. In a like manner, a rear transverse channel or beam 17 is installed in a terminal end of the trailer behind the tandem axle 3 to house two or more such ramp supports 18 protectively within the open outward confines of the beam 17.

These ramp supports are substantially identical in construction, and Figs. 5 and 6 show the same in greater detail. In the latter figures, ramp support 15 is illustrated and comprises an angle 19 welded at 20 to the channel portion of the beam 14 to form a groove 21 between the web of the beam 14 and the upstanding leg 22 of the angle. A number of vertically disposed channels 23 are welded to the bottom flange 24 of the beam 14 and extend upwardly to the base leg 25 of the angle 19 to provide stiff vertical supports for this angle, as well as positioning members.

With this arrangement, runways comprising ramps such as shown in Fig. 2 and indicated in pairs at 26, 27 and 28 can be used to hook over an angle 19 in the manner shown in Fig. 6, which indicates the end 29 of a ramp having a depending leg 30 which can be hooked in back of the vertical leg 22 of the angle 19. For a trailer structure having a bed fully equipped in the manner described, it is possible to provide loading and unloading runways such as are indicated in Fig. 2. One possibility will be to load the entire trailer across from front to back along a path indicated by the dot and dash line A. Another possibility for loading the trailer is indicated by the dot and dash line B, which is a transverse direction with respect to the bed 1. The various angular possibilities of loading and unloading the bed of the present construction are indicated by the four dot and dash curved lines C, D, E and F.

Thus it is possible to use this trailer where quick pickups may be necessary, particularly of disabled vehicles or of large materials that must be moved and in situations wherein the space limitations are such and the time is limited that this trailer must be loaded from one peripheral edge of the bed in order to take care of this particular loading operation. Obviously, the unloading operation may have the same critical limitations which can only be accommodated and solved by a trailer having a universal loading bed such as shown whereby it is possible to load or unload from any peripheral edge thereof whenever necessary.

Referring to Figs. 7 and 8, the trailer of the present construction is illustrated as straddling a ditch 31 that is being excavated by means of the back shovel 32 carried by the operating cab 33 mounted for movement upon a pair of caterpillar tracks 34 and 35. In this particular operation, the ditch 31 is being excavated between obstructions such as a building 36 and another building or other structure 37. After the ditch 31 has been completed, the problem presents itself of removing the shovel equipment illustrated in its entirety by the reference numeral 38. The trailer of the present invention may be used for this particular purpose by running the same crosswise of the ditch 31 over suitable planking into the position indicated in Figs. 7 and 8, whereupon the gooseneck 7 may be lowered to the ground to provide a further unloading ramp from the deck 1 and the auxiliary ramps 26 can be positioned laterally outwardly of the deck 1 and on opposite sides of the ditch 31. The entire excavating shovel 38 can then be removed in the direction of the arrows 39 over the ramps 26 and on to the bed 1 to be turned as shown by the arrows 40 for discharge off of the end of the trailer 7 to another location for digging a similar ditch such as 31. If the work of the shovel 38 is completed, the same may be retained upon the bed 1 for transportation to another field of operation.

The ramp mounting equipment illustrated in Figs. 5 and 6 is primarily designed for the purpose of extending the removable ramps from the bed substantially at right angles to the adjacent end of the bed as illustrated in Fig. 2. Conditions may arise where it is feasible to provide detachable ramps which may be angled with respect to the bed to further increase the utility of the trailer of the present invention in handling and accommodating heavy equipment.

Referring to Figs. 9 and 10, a single ramp such as 41 is indicated as secured to the adjacent end of a trailer bed 42 that is bordered by a beam 43 as a part of the bed structure and also as the means for receiving the ramp 41. In this case, ramp 41 has a straight edge 44 for contacting the ground and terminates with another straight edge 45 that is disposed outwardly of the adjacent edge 46 of the beam 43. A fixture comprising a bracket 47 is bolted or riveted as at 48 to the ramp 41 and projects outwardly from the end thereof at 49 to carry a depending pin 50 at this outward location of the ramp 41. A block 51 is welded or otherwise secured to the beam 43 to form a ledge having an opening 52 therein for loosely receiving the pin 50 in the manner best illustrated in Fig. 10.

The block 51 is relatively long as shown in dotted lines in Fig. 9 to thus provide a sill upon which the lateral corners of the bracket 47 may rest whenever the ramp 41 is moved into positions such as indicated in broken lines at 53 and 54 in Fig. 9 or into any intermediate position therebetween. This structure, therefore, comprises a means whereby it is possible to diagonally load an adjacent edge of the trailer bed such as 42 under many conditions wherein this is the most feasible loading situation. This may also be the only loading position that can be resorted to in some occasions whereby this trailer can be adapted to situations wherein no other standard trailer could be used.

The foregoing description relates to a preferred embodiment of the present invention and any possible modifications therein within the scope of the present inventive concept shall be governed by the breadth and scope of the claims appended hereto.

What I claim is:

1. In a mobile trailer, a bed for supporting a load, a foldable gooseneck carried at one end thereof including a ramp to form an approach to said bed for vehicles when the gooseneck is lowered, an offset deck connected with the other end of the bed, a structural ramp member having a surface disposed contiguous with the surface of said bed and with said offset deck respectively, said offset deck providing means to form a roadway adjacent the bed supporting wheels, ramp receiving and supporting members connected with the outer terminal end of said offset deck, and ramp receiving and supporting members carried at the sides of said bed, all of said members together comprising cooperative means to load a vehicle upon the bed over one peripheral edge thereof and to unload said vehicle over another peripheral edge thereof.

2. In a machinery hauling trailer, a bed, a deck at one end, a structural incline connecting said bed and deck to provide a contiguous roadway surface between the bed and deck, a raised structure at the other end of the bed comprising a hitch, coacting means to displace said raised structure with respect to the adjacent end of said bed to permit loading the bed from said adjacent end thereof, ramp receiving and supporting means connected with one free edge of said deck, and ramp receiving and supporting means connected at the opposite sides of said bed, said bed and all of the aforesaid cooperative assembled elements comprising universal means to load said bed over one peripheral edge thereof and to unload the bed over another peripheral edge thereof.

3. In a trailer, a universally loadable bed comprising a plurality of connected longitudinal and transverse beams, certain of said beams projecting forwardly of the bed, foldable hitch means connected with said projecting beams and arranged to fold downwardly toward the ground adjacent the forward end of the bed for loading, a roadway over said beams, certain other of said beams flanking the sides of said bed to provide recessed channel areas at the laterally outward sides of the bed, ramp receiving structures connected with said side beams and protectively housed within said channel, one of said transverse beams presenting a rearwardly disposed cross channel at the rear of said bed, and ramp receiving structures connected with said transverse beam and carried within the confines of said cross channel at the rear of said bed, said bed roadway being adapted to receive a load over any peripheral edge of the bed and to discharge the load over another peripheral edge thereof.

4. A supporting unit for a material or vehicle hauling trailer comprising a bed, said bed being defined by a plurality of peripheral edges, wheel means to transport said bed, a hitch mechanism on said bed to tow the same, and loading and unloading means for said bed, said latter means comprising in combination a roadway structure to bridge said wheel means for loading or unloading over one peripheral edge the bed over said wheel means, a ramp comprising a part of said hitch mechanism and arranged for lowering to the ground at the hitch end of said bed to load and unload over the adjacent end of said bed, and interchangeable ramp structures connected with the other peripheral edges of the bed to load or unload over said edges, said ramp structures each comprising an angle having one leg connected with said bed and with the other leg thereof disposed in vertical position in spaced relation with respect to said bed, and a ramp for connection with said angle, said ramp having a terminal ledge arranged in downwardly positioned relationship with respect to said ramp for engagement behind said vertical bed angle leg, said angle and said ledge having portions thereof seated in elongated contact along the adjacent bed edge to counteract lateral tilting of said ramp in relation to said bed.

5. A supporting unit for a material or vehicle hauling trailer comprising a bed, said bed being defined by a plurality of peripheral edges, wheel means to transport said bed, a hitch mechanism on said bed to tow the same, and loading and unloading means for said bed, said latter means comprising in combination a roadway structure to bridge said wheel means for loading or unloading over one peripheral edge the bed over said wheel means, a ramp comprising a part of said hitch mechanism and arranged for lowering to the ground at the hitch end of said bed to load and unload over the adjacent end of said bed, and interchangeable ramp structures connected with the other peripheral edges of the bed to load or unload over said edges, said interchangeable ramp structure each having one or more ramps each comprising a runway having pin means at the bed end thereof, and a socket carried by said bed to receive said pin means, said pin means and socket together permitting angling of the runway with respect to the adjacent bed edge whereby diagonal loading of the bed is accomplished over said runway.

6. In a trailer for hauling equipment and materials, the combination of a load receiving bed and ramp means to direct the equipment and materials onto and off of said bed, said ramp means comprising at least one runway for positioning beyond the edge of the bed and extending to the ground, and cooperative means carried by said bed edge and the runway respectively comprising a pin on said runway, and a socket to receive said pin mounted upon said bed to support said runway entirely in a position beyond the adjacent bed edge, said pin and socket comprising means for shifting the angular relation of the runway with respect to the adjacent edge of the bed.

7. In a trailer for hauling equipment and materials, the combination of a bed and ramp means to load and unload said bed, said ramp means comprising at least one runway for positioning between the edge of the bed and the ground, and separable cooperative members carried by said bed and said runway respectively, one of said members including a pin and the other of said members having a pin receiving socket therein, said members having coacting portions thereon arranged for mutual contact contact to stabilize the runway with respect to said bed when the latter two are angularly disposed with respect to each other through the instrumentality of the pin and socket arrangement.

8. In a trailer, a flat top machinery hauling bed, a gooseneck at the forward edge of said bed extending upwardly from and outwardly away from said bed edge, a mobile structure to support the rear end of said bed for transportation comprising a wheeled unit, and a raised platform connected with said wheeled unit and having a deck to provide a runway over said wheeled unit and in elevated relation with respect to said bed, and a contiguous connecting structure to join said platform with the rear edge of the bed for rear end loading or unloading over the wheeled unit and rear edge of the bed, and ramp receiving and supporting members carried adjacent the lateral side edges of the bed and at the rear end of said raised platform for interchangeably or collectively receiving loading ramps to load or unload said bed from either side edge or over the rear edge thereof, and said gooseneck comprising a foldable construction wherein the parts thereof include ramp means to load over the forward edge of said bed when said gooseneck is folded to a position below the flat top loading level of said bed, said gooseneck and said contiguously connected platform together with said ramp receiving and supporting members all providing means for universally loading and unloading said flat machinery hauling bed over any selected one or more peripheral edges thereof.

References Cited in the file of this patent

UNITED STATES PATENTS

| | | |
|---|---|---|
| 846,490 | Loncks et al. | Mar. 12, 1907 |
| 1,035,440 | Holcomb | Aug. 13, 1912 |
| 1,392,835 | Levin | Oct. 4, 1921 |
| 1,482,105 | Andrews et al. | Jan. 29, 1924 |
| 1,698,172 | Ronk | Jan. 8, 1929 |
| 2,327,680 | Tavaris | Aug. 24, 1943 |
| 2,346,605 | Proudfoot | Apr. 11, 1944 |
| 2,431,436 | Townsend | Nov. 25, 1947 |
| 2,443,611 | Ferguson | June 22, 1948 |

FOREIGN PATENTS

| | | |
|---|---|---|
| 23,086 | Great Britain | Oct. 13, 1913 |
| 318,395 | Great Britain | Sept. 5, 1929 |